United States Patent [19]

Boekel

[11] Patent Number: 4,947,517
[45] Date of Patent: Aug. 14, 1990

[54] DEVICE FOR CUTTING LOOSE A BACON- AND/OR FAT LAYER FROM MEAT

[76] Inventor: Cornelis D. Boekel, Kollenbergweg 2, Amsterdam, Netherlands

[21] Appl. No.: 296,158

[22] Filed: Jan. 12, 1989

[30] Foreign Application Priority Data

Jan. 12, 1988 [NL] Netherlands .................... 8800063

[51] Int. Cl.⁵ .......................................... A22B 17/12
[52] U.S. Cl. ........................................ 17/1 R; 17/21;
17/50; 99/589; 83/360
[58] Field of Search .......... 17/1 R, 21, 23, 50;
83/870, 360, 364, 368, 370; 30/276; 99/585, 589

[56] References Cited

U.S. PATENT DOCUMENTS

| | | | |
|---|---|---|---|
| 3,542,105 | 11/1970 | Townsend | 17/50 |
| 4,209,878 | 7/1980 | Albert | 17/21 |
| 4,296,526 | 10/1981 | Tournier | 99/585 |
| 4,408,519 | 10/1983 | Schill | 99/589 |
| 4,423,671 | 1/1984 | Murphy | 99/589 |

FOREIGN PATENT DOCUMENTS

| | | | |
|---|---|---|---|
| 3138912 | 4/1983 | Fed. Rep. of Germany | 17/50 |
| 3716037 | 2/1988 | Fed. Rep. of Germany | 17/21 |

*Primary Examiner*—Willis Little
*Attorney, Agent, or Firm*—Pollock, VandeSande and Priddy

[57] ABSTRACT

Device for cutting loose a bacon- and/or fat layer from meat, consisting of a frame having a transportation surface for the meat to be processed and in which transportation surface a gripping roll has been arranged or to which transportation surface a gripping roll adjoins, by means of which the meat may be drawn against and past a cutting knife mounted mear the gripping roll the height of the cutting knife being continuously adjustable under the control of an ultrasonic sensing device which detects the position of the separating plane between the meat and the bacon- or fat layer.

6 Claims, 1 Drawing Sheet

DEVICE FOR CUTTING LOOSE A BACON- AND/OR FAT LAYER FROM MEAT

BACKGROUND OF THE INVENTION

The invention relates to a device for cutting loose a bacon- and/or fat layer from meat, consisting of a frame with a transportation surface for the meat to be processed and in which transportation surface a gripping roll has been arranged or to which transporting surface a gripping roll adjoins, by means of which the meat may be drawn against and past a cutting knife arranged near the gripping roll, while this cutting knife may be adjustable in height relative to the gripping roll to adapt the knife to the thickness of the bacon- or fatlayer to be cut loose.

Such a device is known.

When using this known device, the average thickness of the bacon- or fatlayer to be cut off from the meat is estimated or measured and on the basis of this average thickness the cutting knife is adjusted relative to the gripping roll.

This method has the disadvantage that the bacon- or fatlayer to be removed, which naturally does not have a same thickness everywhere, is only locally cut away to an optimum.

The meat processed by the known device shows local bacon- or fat layers at those places where the original layer thickness was greater then the estimated or measured average thickness on the basis of which the cutting knife was adjusted with respect to the gripping roll.

The present invention intends to obviate this disadvantage of the known device.

SUMMARY OF THE INVENTION

The device according to the present invention is characterized in that the cutting knife may be adjusted in height under control of at least one sensing device which detects the separating plane between the meat and the pork- or fat layer.

This sensing device may have been mounted favourably immediately in front of the cutting knife, so that by moving on the meat to be processed over the transportation surface, the cutting knife is continuously adjusted in height relative to the gripping roll, so that considerably less bacon- or fat remainders will be left on the meat.

The sensing device may be carried out in various ways. For example, the position of the separating plane between the meat and the bacon- or fat layer present thereon may be determined by measuring electrical conductivity that, in the bacon- or fat layer, differs considerably from that of the underlying meat.

In the preferred embodiment of the device according to the invention, the sensing device is formed by an ultrasonic measuring device which produces an output signal that is used to control the height adjustment of the cutting knife.

Besides the thickness of the bacon- or fat layer to be cut loose varying in the direction of transport, such may also be the case the direction perpendicular to the direction of transport. In order to be able to cut away the locally thickness differing bacon- or fat layers transverse to the direction of transport in a favourable manner, the cutting knife, according to a further feature of the invented device, is subdivided into sections, which each separately may be adjusted in height under control of an associated sensing device.

As already remarked herebefore, the sensing device as seen in the direction of transport, favourably may have been mounted in front of the cutting knife. In a further working out of the device according to the invention, a second sensing device is arranged behind the cutting knife to produce a signal which is inverse feed back coupled to the first sensing device.

The height adjustment of the cutting knife or the cutting knife sections may be carried out in a known way, such as for instance by means of a hydraulic cylinder or hydraulic cylinders.

In another embodiment of the device according to the invention, the cutting knife is flexible in a direction transverse to the direction of meat transport, and is mounted on a number of knife supporting elements, distributed along the length of the knife, each of which supporting elements may be adjusted in height under the control of an associated sensing device. In this embodiment of the device according to the invention, the bacon- or fat layers, of which the separating plane generally extends in an undulating fashion, are cut off in a corresponding manner during the operation.

BRIEF DESCRIPTION OF THE DRAWINGS

The invention will now be further explained by way of example with reference to the accompanying drawing, in which.

DESCRIPTION OF THE PREFERRED EMBODIMENTS

Figure 1:
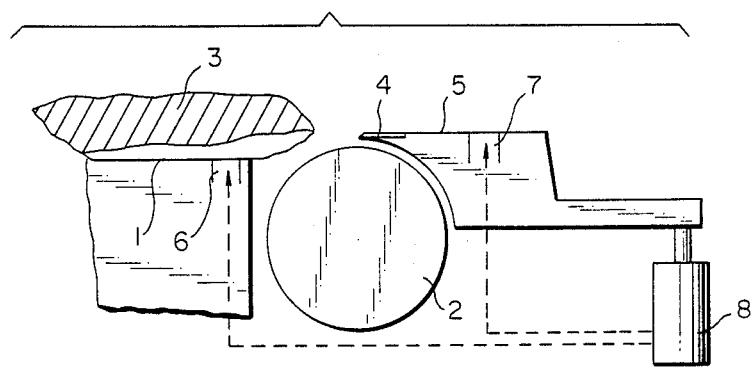
FIG. 1 is a schematic side view of an embodiment of the invention.

As is shown in FIG. 1, the device is provided with a transportation surface 1 to which a toothed rotatable gripping roll 2 adjoins, and by means of which a piece of meat 3 provided with a bacon layer on its underside may be drawn against and past a cutting knife 4, and during which the bacon layer is cut loose from the underside of the meat.

Immediately behind the cutting knife 4 a further transportation surface 5 is present, over which the processed meat may be carried off. The severed bacon or fat layer passes under surface 5 and is thereby separated from the processed meat on surface 5.

Figure 2:
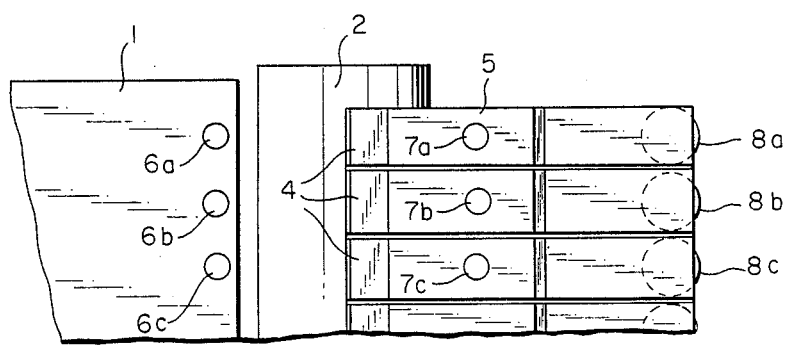
FIG. 2 is a top view of the embodiment according to FIG. 1.

As shown in FIG. 2, the cutting knife 4 is subdivided into a number of sections 4 a, b, c, etc., each of which may separately be adjusted in height relative to the gripping roll 2 under the control of an ultrasonic transducer or sensor 6 a, b, c, etc. located below surface 1. With the height adjustments of the knife sections 4, a, b, c, etc. under control respectively of the associated sensors 6, a, b, c, etc. the bacon layer present in a generally not flat plane may be cut loose from the meat in a relatively selective manner.

In the device according to this embodiment the depth adjustment of the succeeding knife sections will generally take place gradually.

As is further shown in the drawing, a second sensor 7 a, b, c, etc. has been arranged behind each knife section, below surface 5 and the output signals of sensors 7a, b, c, etc. are coupled in inverse feed back in respect to the output signals of the first sensors 6, a, b, c, etc.

The transportation surface 5 and the several knife sections may be adjusted in height in a known manner, such as for instance by means of hydraulic cylinders 8 a, b, c etc. which engage the interconnected elements 4, 5 as shown in FIGS. 1 and 2.

I claim:

1. An apparatus for cutting a bacon or fat layer from a piece of meat, comprising means defining a first surface for supporting a piece of meat having an underside layer which is to be cut therefrom, means for continuously moving said piece of meat and said underside layer in a linear direction along said first surface, at least one cutter knife disposed in adjustable position above the level of said first surface for severing said layer from the underside of said piece of meat during movement of said piece of meat along said first surface toward and into engagement with said cutter knife, means defining a second surface disposed in adjustable position above the level of said first surface downstream of said cutter knife for receiving said piece of meat after said layer has been cut therefrom, the layer cut from said piece of meat by said cutter knife passing below said second surface to separate said layer from said piece of meat, ultrasonic sensing means disposed below said first surface upstream of said cutter knife for continuously sensing the position a separation plane between said piece of meat and said layer during the continuous movement of said piece of meat and said layer along said first surface toward said cutter knife, and means responsive to an output signal from said ultrasonic sensing means for adjusting the height of both said cutter knife and said second surface relative to said first surface during the continuous movement of said piece of meat and said layer along said first surface, thereby to assure that said cutter knife and said second surface are each properly positioned relative to the prevailing position of said separation plane as said piece of meat and said underside layer to be cut therefrom are moved into engagement with said cutter knife.

2. The apparatus of claim 1 wherein a plurality of said cutter knives are disposed in side by side relation to one another above said first surface, the height of each of said knives above said first surface being individually adjustable, said ultrasonic sensing means comprising a like plurality of ultrasonic sensors disposed in spaced relation to one another along a line transverse to the direction of movement of said piece of meat along said first surface, the output signals from said ultrasonic sensors being used respectively to adjust the height of respective ones of said cutter knives above said first surface.

3. The apparatus of claim 1 including further sensor means disposed adjacent said second surface for providing an output signal which varies with changes in position of said second surface relative to said first surface, and inverse feedback means coupling the output signal of said further sensor means to said ultrasonic sensing means.

4. The apparatus of claim 1 wherein said cutter knife and said second surface are interconnected to one another and are adjustable in height as a unit relative to said first surface.

5. The apparatus of claim 1 wherein said means for moving said piece of meat along said first surface comprises a roller which is in gripping engagement with said piece of meat and its said underside layer adjacent said first surface.

6. The apparatus of claim 1 wherein means for adjusting the height of said cutter knife and said second surface comprises hydraulic cylinder means connected to both said cutter knife and said second surface.

* * * * *